United States Patent [19]

Morrison

[11] 3,863,034

[45] Jan. 28, 1975

[54] TRANSLATOR ALARM

[75] Inventor: Ralph Morrison, Pasadena, Calif.

[73] Assignee: Communication Mfg. Co., Long Beach, Calif.

[22] Filed: Apr. 6, 1973

[21] Appl. No.: 348,476

[52] U.S. Cl. ...................... 179/18 ET, 179/175.2 C

[51] Int. Cl. ............................................ H04q 3/47

[58] Field of Search... 179/18 ET, 175.2 C, 175.2 R

[56] References Cited

UNITED STATES PATENTS

| | | | |
|---|---|---|---|
| 3,099,720 | 7/1963 | Gotthardt | 179/175.2 R |
| 3,681,534 | 8/1972 | Burian et al. | 179/18 ET |
| 3,725,614 | 4/1973 | Slana | 179/175.2 R |

*Primary Examiner*—Thomas W. Brown
*Attorney, Agent, or Firm*—Christie, Parker & Hale

[57] ABSTRACT

Translator alarm for detecting erroneous electrical connections between any pair of terminals and between different pairs of terminals of a matrix. The alarm has a plurality of pairs of terminals for connection to the pairs of terminals of the matrix. A circuit applies a potential between each of the terminals pairs to another. A detecting circuit, for each terminal pair, senses the potential between the corresponding terminal pair. Another detecting circuit for each terminal pair, senses the signal on at least one of the corresponding terminal pairs.

18 Claims, 3 Drawing Figures

TRANSLATOR ALARM

CROSS-REFERENCE TO RELATED APPLICATION

This patent application discloses the same subject matter as the patent application entitled "TRANSLATOR ALARM" filed in the name of Luis A. Arce, Orrin B. O'Dea and Ralph Morrison, now being Ser. No. 348,477, filed on even date herewith.

BACKGROUND OF THE INVENTION

This invention relates to translating devices and more particularly to circuits for checking the proper operation thereof.

Translator circuits are commonly used in telephone equipment to detect the source of calls and to cause the call to be appropriately charged to a subscriber. A read only type memory is used in the translator for identifying the customer originating a call. One translator circuit is of the type disclosed in the Manual Crossbar Systems No. 5 Translator Circuit AMA CD-26019-01 Issue 2D by Bell Telephone Laboratories, Incorporated.

It is essential taht workmen be allowed to work in and around the translator making repairs and changes. However, workmen inadvertently drop wires or other metal parts into the translator causing various terminals in the translator to be shorted together. Translators utilize a combination of relays in combination with the read only memory. If a call is originated by a first customer while the short exists, the combination of relays actuated together with the short may cause a charge to be erroneously made to a second customer. It is therefore desirable to detect the short immediately upon forming the short before a customer originates a call to prevent malfunction of the translator.

Translator alarm detectors have been provided for detecting erroneous connections between terminals. One type of detector is one wherein each terminal pair is coupled to one side of a relay coil, the relay coil is energized when the translator is operated, for example, by a subscriber making a legitimate call in combination with an erroneous short. However, such a detector requires that the translator actually be used by a customer before the relay coil is energized. Obviously such an arrangement may cause a charge to be erroneously made to another customer. With the aforementioned system it is not possible to know about the short circuit until after the erroneous charge is made. This is highly undesirable because of customer aggravation and waste of time required to correct the erroneous charge, etc.

Other arrangements have been proposed for solving the aforementioned problem. On such arrangement requires a memory and a scanner to compare switch states on a recurring basis. However such a method is very difficult to apply to the translator and is highly expensive. Another approach is to use pulse circuitry to sense the shorts. However this approach is undesirable because of the expense involved.

BRIEF SUMMARY OF THE INVENTION

Briefly, an embodiment of the present invention involves a translator alarm for detecting erroneous connections between any pair of terminals and between different pairs of terminals of a matrix. A plurality of pairs of terminals are provided, one pair for each pair of terminals of the matrix. Means applies a potential between each of the terminal pairs and is adapted for applying cascaded signals from one terminal pair to another. Means, for each terminal pair, senses a potential between the corresponding terminal pair. Means, for each terminal pair, senses the signal on at least one of the corresponding terminal pairs.

According to a preferred arrangement of the invention, an impedance is connected between each pair of terminals and a current signal as applied therethrough to form the potential between terminals. The impedance can be located either in the matrix or in the translator alarm.

According to a preferred embodiment of the invention the electrical signal applying means comprises a source of potential having an output with first and second sides. A first impedance means for one terminal of each terminal pair couples the corresponding terminal to the first side of the source. A second impedance means for the other terminal of each terminal pair couples the corresponding terminal to the second side of the source. Preferably the impedance means have values which cause a staggered signal from terminal pair to terminal pair when current flows between individual terminal pairs.

According to another preferred embodiment means provides a series of staggered reference signals, one reference signal for each terminal pair. The potential sensing means have an input coupled to the signal on the corresponding terminal pair and to the corresponding reference signal and are adapted for providing a predetermined output signal responsive to a predetermined change in signal on the corresponding terminal pair relative to the corresponding reference signal.

According to another embodiment of the present invention there is disclosed a method for detecting erroneous connections between any pair of terminals and between different pairs of terminals in a matrix, the matrix being characterized in that for each terminal pair an impedance is connected therebetween or it is possible to connect an impedance therebetween and there is no connection from one terminal pair to another or the connection from one terminal pair to another is such that cascaded signals can be established from one terminal pair to another, the method comprising: applying individual signals between each of said terminal pairs; applying cascaded signals to said matrix, one different such cascaded signal being applied to each terminal pair; sensing a predetermined change in the individual signal between any one of said terminal pair to detect an erroneous connection therebetween; and sensing a predetermined change in cascaded signal applied at any one of said terminal pairs to detect an erroneous connection from one terminal pair to another.

According to a preferred embodiment of the invention the step of applying individual signals applies current signals between each of such terminal pairs. According to another preferred embodiment the step of applying cascaded signals applies a voltage signal to each terminal pair.

Such embodiments of the present invention provides a low cost, simple and reliable approach to sensing shorts between terminal pairs or from one terminal pair to another immediately upon their occurrence thereby avoiding the problems of the prior art detector discussed above.

DESCRIPTION OF THE PREFERRED EMBODIMENTS

Figure 2:
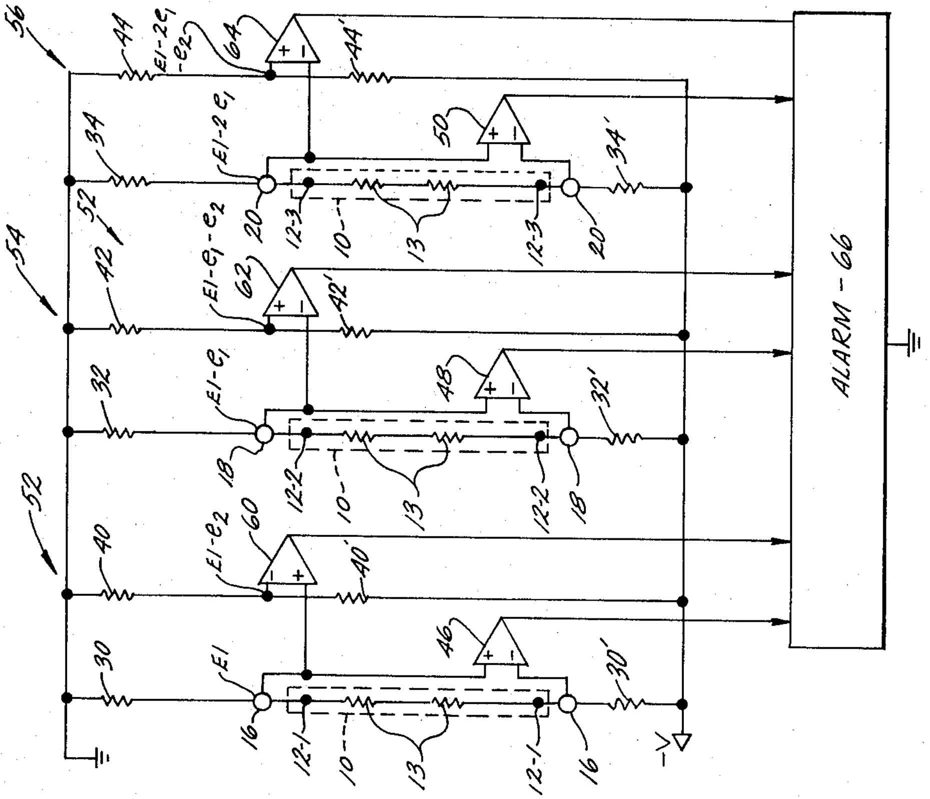
FIG. 2 is a schematic and block diagram of a specific embodiment of the translator alarm generally depicted in FIG. 1 and embodies the present invention.

Refer now to the block diagram FIG. 1 which embodies the present invention. 10 generally depicts a matrix consisting of a translator of the general type referred to hereinabove. The only parts of the matrix 10 shown are a plurality of terminals arranged by way of example into three terminal pairs 12–1, 12–2 and 12–3 with impedances 13 connected between terminal pairs.

The terminals 12 generally depict test points, connectors or other conductors in the matrix of 10 which are exposed and subject to possible accidental shorts. Although matrix 10, by way of example, is the above referenced translator it may be any one of a number of different types generally characterized in that (1) an impedance is connected between each individual terminal pair or (2) it is possible to connect an impedance therebetween of selected value so as to provide a path for current flow in between each individual terminal pair and (3) there is no connection from one terminal pair to another or (4) the connection from one terminal pair to another is such that it will allow the establishment of cascaded signals from one terminal pair to another. In the aforementioned translator the impedances 13 are resistors that are already connected between the terminal pairs 12.

Figure 1:
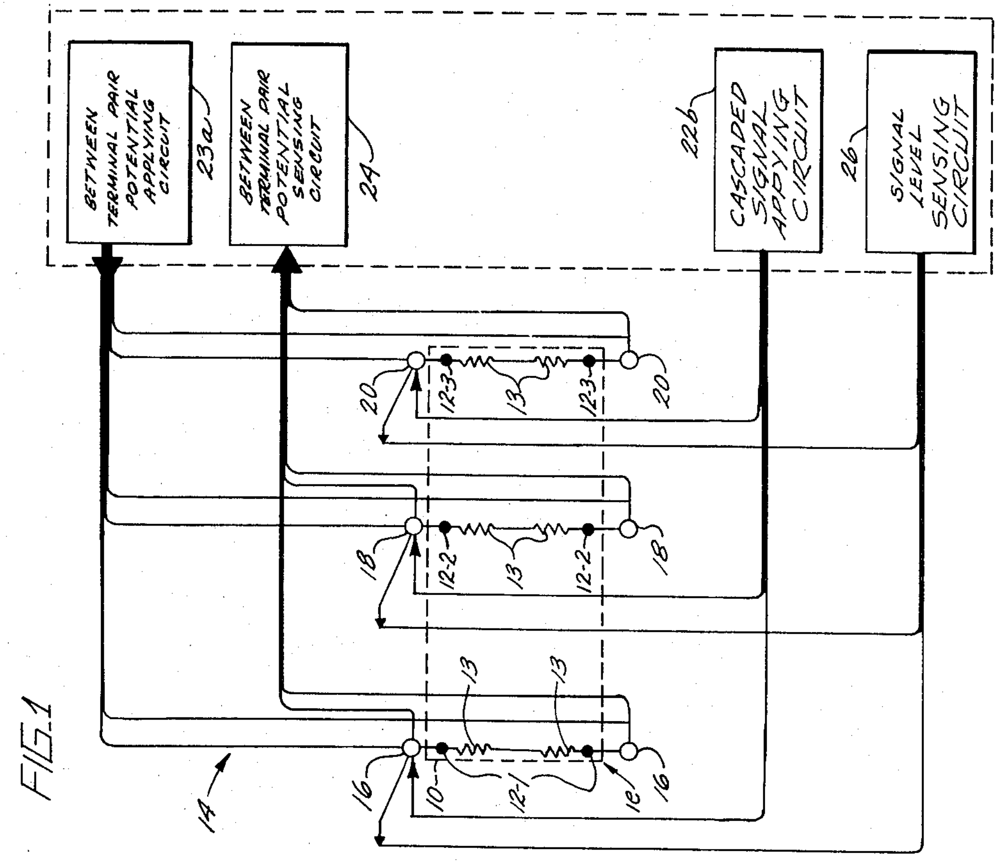
FIG. 1 is a general schematic and block diagram of a translator alarm and embodies the present invention.

The translator alarm 14 consists of everything depicted in FIG. 1 except for the matrix 10 indicated by dashed lines. A plurality of terminal pairs 16, 18 and 20 are connected, respectively, to matrix terminal pairs 12–1, 12–2 and 12–3. Thus there is one translator terminal pair for, and connected to, each fo the matrix terminal pairs.

The translator alarm 14 also includes a means **22*a* and 22*b* for applying an electrical potential between each of the translator terminal pairs 16, 18 and 20. Additionally, the means 22*a* and 22*b* is adapted for applying cascaded signals from one terminal pair to another. For purposes of illustration between terminal pair potential applying circuit 22*a* is shown having a separate pair of output lines coupled across each of the terminal pairs 16, 18 and 20. Between terminal pair potential applying circuit 22*a* applies a current signal between each terminal pair and due to the impedance 13** a potential difference is established in between each of the terminal pairs.

A cascaded signal applying circuit **22*b* is detected for applying the cascaded signals to the terminal pairs 16, 18 and 20. Since the individual terminal pairs 16, 18 and 20 are interconnected by means of the impedances 13,** a bias applied to one of the terminals of each pair will bias the other terminal of each pair thereby causing cascaded signals on the other terminals of slightly different value than the first mentioned cascaded signals.

A between terminal pair potential sensing circuit 24 senses the potential difference between individual terminal pairs. In a preferred embodiment there is a separate potential sensing circuit for each terminal pair 16, 18 and 20.

A signal level sensing circuit 26 is depicted for sensing the signal at each of the terminal pairs 16, 18 and 20. Again a preferred embodiment of the invention has a separate circuit for each terminal pair for sensing the signal on at least one of each of the terminal pairs 16, 18 and 20.

In operation the between terminal pair potential applying circuit **22*a* causes a current to flow between each of terminal pairs 16, 18 and 20, through impedances 13, thereby establishing a potential difference between each pair of translator terminals. The cascaded signal applying circuit 22*b*** applies a series of cascaded signals from one translator terminal pair to another.

Assume that no short exists between any of the matrix terminals. Under these conditions the between terminal pair potential sensing circuit 24 senses the presence of a potential difference between each of the matrix terminal pairs and provides a first output signal. Also, the signal level sensing circuit 26 senses that the signal (with respect to ground) on each of the terminal pairs is of the proper level and also forms a first output signal.

Assume a short is established between terminal pairs 16. The potential difference between terminal pairs 16 is eliminated, but the signal on terminal pair 16 with respect to ground does not change appreciably. Therefore the signal level sensing circuit 26 still forms the first output signal. However, the between terminal pair potential sensing circuit 24 senses the lack of a potential difference between terminal pairs 16 and forms a second alarm signal thereby indicating a short exists.

Assume a short between the upper terminal of terminal pair 16 and one of terminal pair 18. Also assume that the applied cascaded signal is establishing a lower signal on terminal pair 18 than terminal pair 16. Substantially the same current flows between terminal pairs 16 and the same potential difference exists between terminal pairs 16. Hence the between terminal pair sensing circuit 24 still forms the first output signal. However, this condition will cause the signal on terminal pair 16 to drop to a signal intermediate that of the signals applied to terminals 16 and 18. The signal level sensing circuit 26 senses the erroneous signal at terminal pair 16 and forms a second alarm signal.

Refer now to the specific embodiment of the present invention shown in FIG. 2. The electrical signal applying means comprises a power supply or source of potential depicted between ground and $-V1$. Also included in the electrical signal applying means is a first impedance 30, 32 and 34 for one terminal of each translator terminal pair for coupling the corresponding terminal to one side of the source (e.g., ground). A second impedance 30', 32' and 34' is provided for the other terminal of each translator terminal pair for coupling the corresponding terminal to the second side of the source (e.g. $-V$).

With such an arrangement the impedances 30 through 34 and 30' through 34' in combination with impedances 13 provide a current signal between each of the terminal pairs 16, 18 and 20. Thus a current is established passing between each of the terminal pairs 16, 18 and 20 via the impedances 13 which creates a potential difference between terminal pair.

The means for each terminal pair for sensing a potential in between the corresponding terminal pair consists of detecting circuits 46, 48 and 50. The detecting circuits have a pair of inputs which are coupled across the corresponding translator terminal pair.

Means 52, 54 and 56 are provided for each terminal pair for sensing the signal on at least one of the corresponding translator terminal pairs 16, 18 and 20. Each of the means 52, 54 and 56 consist of a voltage divider and a potential difference sensing means or detecting circuit. The voltage dividers in 52, 54 and 56 are formed by resistors 40 – 40′, 32 – 32′ and 34 – 34′ respectively. The junction between the voltage dividers provide a series of cascaded reference signals, one reference signal for each of the terminal pairs 16, 18 and 20. The detecting circuits 60, 62 and 64 of means 52, 54 and 56 each having one input coupled to the cascaded reference signal from the corresponding voltage divider and a second input coupled to the cascaded signal from the corresponding translator terminal pair. An alarm 66 is provided for indicating a short either between terminals of the same terminal pair or from one terminal pair to another.

Consider now the cascaded potentials at the terminal pairs 16, 18 and 20 and the relation thereof to the cascaded signals formed by the voltage dividers. The impedances 13 between each of the matrix terminals 12–1, 12–2 and 12–3 are of the same value and the relative value of the impedances 30 to 34 and 30′ to 34′ are selected in a well known manner such that staggered signals are provided from one terminal pair to another terminal pair when current flows in between terminal pairs. For example, the signal at the upper one of the terminal pairs 16, 18 and 20 may be represented by the cascaded voltages E1, E—$e_1$, E1-2$e_1$, where $e_1$ depicts the desired difference or incremental voltage from one terminal pair to the next. It should be noted that the voltage difference from one translator terminal pair to the next need not be the same but may be different. The cascaded signals at the lower one of the terminal pairs 16, 18 and 20 will have a similar relationship. The voltage dividers of the circuits 52, 54 and 56 form a series of cascaded reference signals, one reference signal for each of the terminal pairs, 16, 18 and 20. The cascaded reference signals are related to the cascaded signals applied to the terminal pairs 16, 18 and 20. The cascaded reference signals formed in circuits 52, 54 and 56 are depicted by the cascaded voltages E1-$e_2$, E1-$e_1$-$e_2$ and $E_1$-2$e_1$-$e_2$. Thus the cascaded reference voltages are lower than that of the corresponding cascaded voltages (at the upper one of terminal pairs 16, 18 and 20) by an amount $e_2$. It should be noted that the voltage difference between the applied and reference value need not be the same but could be different from one terminal pair to the next.

The detecting circuits 46, 48, 50, 60, 62 and 64 each are the type which forms a first output when the input signal at one input (+) is positive with respect to the signal at the other input (−) and provides a second output signal when the signal across the input is reversed or 0. The + and − signs are used in FIG. 2 to depict the corresponding terminals.

Consider now the operation of the translator alarm depicted in FIG. 2. Assume initially, that no shorts exist and the translator alarm is in operation. Current flows between ground and −V via resistors 30–30′, 32–32′ and 34–34′ and the corresponding resistors 13 (not shown) in the matrix 10. As a result a voltage is developed between terminal pairs 16, 18 and 20 which is positive at the upper terminal with respect to the lower terminal. This causes the corresponding detecting circuits 46, 48 and 50 to form a first output indicating the lack of any shorts between the same terminal pairs. Additionally, current flows between ground and the −V terminal via the voltage divider resistors 40 – 40′, 42 – 42′ and 44 – 44′. This causes the voltage at each junction between each pair of voltage divider resistors to form a signal which is slightly negative with respect to the voltage on the upper terminal of the corresponding terminal pair. This in turn causes the corresponding detecting circuits 60, 62 and 64 to form a first output indicative of the lack of any shorts from one terminal pair to another terminal pair.

Assume now that a short occurs between terminal pair 16. The potential across the input to the detecting circuit 46 drops to zero causing the detecting circuit 46 to form a second alarm output indicating a short between the corresponding terminal pair. This energizes the alarm 66 causing it to form an output signal indicating a short.

Assume that the short between terminal pair 16 is removed and that a short occurs between the upper one of terminal pair 16 and the lower one of terminal pair 20. Under these conditions, the voltage at the lower terminal of terminal pair 20 causes the voltage at the upper one of terminal pair 16 to drop. The value of the resistors 13 is in the order of one three-hundredths of that of resistor pairs 30 – 30′ or 32 – 32′ or 34 – 34′. Therefore, the voltage at the lower one of terminal pair 16 also drops about the same amount as the upper one. Therefore the detecting circuit 46 does not detect a short and still forms its first output.

However, the drop in potential in the upper one of terminal pair 16 causes the + input of detecting circuit 60 to drop below the potential $E_1$–$e_2$ formed by the voltage divider resistors 40 – 40′ at its other input. As a result the detecting circuit 60 forms a second alarm output causing the alarm 66 to again form an output indicating the short. A similar analysis can be used to show the operation of the other detecting circuits.

Figure 3:
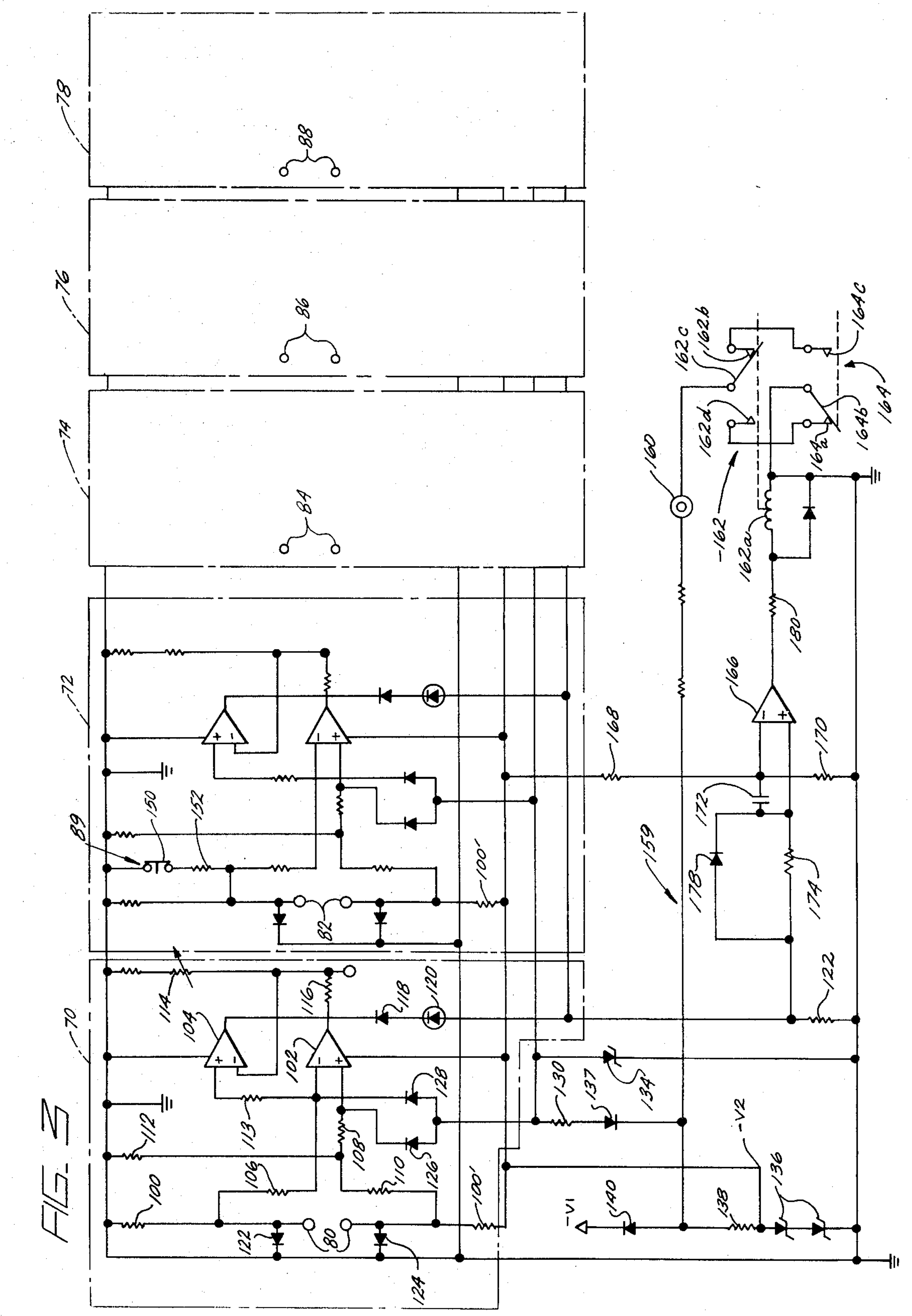
FIG. 3 is an alternate specific embodiment of the translator alarm generally depicted in FIG. 1 and embodies the present invention.

Refer now to the alternate specific embodiment of the present invention shown in FIG. 3. Five translator alarm terminal pairs 80, 82, 84, 86 and 88 are depicted. Rather than show the details of the entire translator alarm of FIG. 3, only stages 70 and 72 are shown in detail, stages 74, 76 and 78 being depicted by dashed lines as they are essentially the same as stage 72. Stage 70 is also quite similar to stages 72–78 except that it does not have a reset circuit 89 which is present in stages 72–78. The reset circuit 89 will be discussed in more detail hereinafter.

Since the stages are essentially the same except for the reset circuit, stage 70 will be described in detail and subsequently the modification provided by the reset circuit 89 will be described. In order to provide a clear understanding of the relation between the elements of FIGS. 1 and 2 and that of FIG. 3, the correspondence will be pointed out. A source of potential is indicated generally between the ground terminal and a −V2 output of a power supply. Resistors 100 – 100′ correspond to resistors 30 – 30′ of FIG. 2 and form first and second impedance means, one for each terminal of the pair for coupling the corresponding terminal pair 80 across the power supply. Detecting circuits 102 and 104 correspond to detecting circuits 46 and 60 of FIG. 2. The detecting circuits 102 and 104 of FIG. 3 are actually an integrated circuit chip manufactured by Signetics, known as the 5558, but are depicted as separate circuits in FIG. 3 for ease of explanation. The detecting circuit 102 has a pair of inputs which are coupled through resistors 106 and 108 across the terminal pair 80. The value of resistors 106 and 108 are in the order of 10 to 20 times higher than that of the resistance connected between terminals 80 and therefore a negligible amount of current flows through resistors 106 and 108 as compared with the current flowing between the terminal pair 80. Resistors 112 and 110 are serially connected together between the ground connection and the lower one of the terminal pair 80 and normally provide a proper voltage difference between the input of the detecting circuit 102.

The detecting circuit 104 has its − input connected to the output of detecting circuit 102 and has its + input connected through a resistor 113 and the resistor 106 to the upper one of the terminal pair 80. To be explained in more detail this sort of connection between the detecting circuits 102 and 104 is provided so that only the output of the detecting circuit 104 needs to be monitored to detect a short in each stage either between the same terminal pair or from one terminal pair to another. This is in contrast to the circuits of FIG. 2 where both detectors of each stage must be monitored or an "OR" type gate connected across both outputs to provide the single output.

Looking in more detail at the interconnection between the detecting circuits 102 and 104, the output of detecting circuit 102 is connected serially through resistors 116 and 114 to ground. The voltage detecting circuits 102 and 104 are characterized in that a large negative potential is formed at the output thereof which is slightly less than equal to the power supply potential of −V2 when the potential across the input thereof is a positive potential at the + input with respect to the − input, whereas a signal approximately equal to ground is formed at the output when the potential across the inputs is 0 or reversed. The resistors 114 and 116 form a voltage divider which cooperate with the normal large negative output signal from the detecting circuit 102 to provide a reference voltage at the − input to the detecting circuit 104 which is slightly lower than the voltage at the upper one of terminal pairs 80.

The output of the detecting circuit 104 is serially connected through a diode 118, a light emitting diode 120 and a resistor 123 to ground. To be explained in more detail detecting circuit 104 forms a negative output signal which energizes the light emitting diode 120 whenever a short exists either between terminal pairs or from one terminal pair to another.

Diodes 122 and 124 are coupled between ground and the terminal pair 80 in order to protect the detecting circuits 102 and 104 against large positive voltage spikes appearing between the terminals 80. Diodes 126 and 128 are connected between the inputs to the detecting circuit 102 and a common junction which in turn is serially connected through resistor 130, diode 132 to the power supply. The diodes 126 and 128 prevent voltage swings from being applied to the inputs of the detecting circuits, which voltage swings are greater than the output from the power supply.

Returning to the power supply, the power supply is formed by the series connection of a diode 140, resistor 148, and a pair of Zener diodes 136 connected between a −V1 source of potential and ground. The junction between the diode 140 and resistor 148 are connected to the cathode of the diode 132 for providing the clamping voltage for the diodes 126 and 128. The junction between the resistor 138 and the upper Zener 136 provides the source of potential −V2.

The reset circuit 89 of stage 72 is connected essentially the same in stages 74–78 therefore only reset circuit 89 of stage 72 will be explained. The reset circuit 89 comprises the series connection of a switch 150 and a resistor 152, serially connected between ground and the upper terminal pair 82. To be explained in more detail, the switch 150 is normally open. Closure of switch 150 is used to determine the location of a short.

In one embodiment of the invention the values of the resistors for stages 70 through 78 are selected so as to provide a current of 10 micro-amperes between each terminal pair with a 10k ohm resistance connected between each pair of terminals, about a 30 volt swing in voltage at the output of the detectors and values of cascaded voltage at the upper and lower terminals of the terminal pairs as indicated in Table I.

TABLE I

| Terminal Pair | Upper | Lower |
|---|---|---|
| 80 | − 7.95 | − 8.028 |
| 82 | −11.7 | −11.82 |
| 84 | −16.5 | −16.57 |
| 86 | −19.70 | −19.79 |
| 88 | −24. | −24.08 |

Consider now the operation of the circuit of FIG. 3, thus far described. Assume that the circuit is in operation with each of the terminal pairs 80, 82, 84, 86 and 88 connected across a 10k resistance as depicted in FIGS. 1 or 2. Current flows between the terminal pairs 80 - 88 from ground to the −V2 potential creating a positive potential on the − input with respect to the + input of the detecting circuit 102 of each of the stages 70 - 78. Accordingly, the detecting circuit 102 forms a negative output which in turn causes a negative input to the corresponding detecting circuit 104.

The input voltage across the − to + input of detecting circuit 104 is reversed causing it to form a 0 volt output signal and the light emitting diode 120 is extinguished.

Assume that a short occurs between terminal pair 80. The short between terminal pair 80 will cause the potential between the terminal pair 80 to be eliminated. Current flowing through resistors 110 and 112 will cause a positive input on the + input with respect to the − input of detecting circuit 102 which in turn will cause the detecting circuit 102 to form a 0 volt output signal. The 0 from detecting circuit 102 via the voltage divider resistors 114 and 116 will cause the − input of detecting circuit 104 to raise above the negative potential at the + terminal thereof which in turn causes detecting circuit 104 to form a negative output signal approximately equal to the power supply −V2, thereby energizing the light emitting diode 120. Energization of the light emitting diode 120 indicates that there is a short in the translator alarm system and one of the terminals affected is one of the terminal pair 80.

However, it cannot be visually determined at this point whether the short is between terminal pair 80 or from terminal pair 80 to one of the other terminal pairs in the system. Therefore the user actuates each one of the switches 150 in the reset circuits 89 in stages 72 through 78. Since the short is between terminal pair 80 the light emitting diode 120 will not be de-energized by actuation of the switches, therefore it can be deduced that the short is between terminal pair 80 rather than from one of terminal pair 80 to some other point in the system.

Assume now that the short between terminal pair 80 is removed and that a short occurs between the upper one of terminal 80 and one of terminal pair 82. In stage 70 the short will cause the voltage at the upper terminal pair 80 to drop and thereby cause the potential at the + input of detecting circuit 104 to fall below the voltage at the − input. This will cause the detecting circuit 104 to change states and form a negative output which again energizes light emitting diode 120.

Assume now that an operator actuates the switch 150 in each of the resetting circuits 89 of stages 72 – 78. The operator under these conditions will discover that actuation of switch 150 in stage 72 raises the voltage at the upper one of terminal pair 82 and thereby draws the voltage on the upper one of terminal pair 80 sufficiently high that the + input of detecting circuit 104 becomes higher than the voltage at the − input. Under these conditions the detecting circuit 104 forms essentially a 0 volt output and the light emitting diode 102 will be extinguished. It is then known that the short exists between one of terminal pair 80 and one of terminal pair 82.

Therefore, the detecting circuit of FIG. 3 provides a novel, simple, reliable and low cost method for determining the points between which a short exists in the matrix across which the terminal pairs are connected.

Consider now the audible alarm system, the anode of light emitting diode 120 in each of stages 70 – 78 are connected together through a resistor 122 to ground. Whenever any one of the light emitting diodes is energized the signal at the junction of the resistor 122 in the light emitting diodes drops to a large negative voltage which is slightly less than the potential at −V2. This signal is used to activate an audible horn 160.

A relay 162 has a coil 162*a* connected between ground and a detecting circuit 166 through a resistor 180. The relay 162 has a contact 162*b* and 162*d* and a pole 162*c* which is in contact with contact 162*b* when the coil 162*a* is not energized. A switch 164 has contact 164*a* and a pole 164*b*, the latter normally being in contact with contact 164*a*. The detecting circuit 166 is similar in construction and operation to detecting circuits 102 and 104 and has a + input connected through a resistor 174 to the junction of resistor 122 and the anode of light emitting diodes 120. The − input of detecting circuit 166 is connected to a voltage dividing circuit comprising the serial connection of resistors 168 and 170 which are connected between −V2 and ground. The junction of resistors 170 and 168 is also connected through a capacitor 172 to the − input of detecting circuit 166. A diode 178 is connected in parallel with the resistor 174.

Consider now the operation of the audible alarm system 159. Assume that there are no shorts, accordingly, none of the light emitting diodes 120 have been energized. Under these conditions, essentially no current is passing through the resistor 122 and accordingly the + input of detecting circuit 166 is at ground. The voltage dividing resistors 168 and 170 bias the − input of detecting circuit 166 at a slightly negative potential causing the output thereof to be essentially at 0 volts which in turn causes the relay 162 to be de-energized and the contacts to be as shown in FIG. 3.

Assume now that one of the light emitting diodes 120 is energized as described hereinabove. A current under these conditions will flow through the resistor 122 causing a large negative potential to suddenly be applied at the junction of resistor 122 and the light emitting diodes 120. The large negative potential in turn causes both terminals of the detecting circuits 166 to drop approximately the same amount. The capacitor 172 forms a temporary memory device which maintains the same potential difference between the detecting circuit 166 as existed prior to the drop in voltage. Should the short go away rapidly, the circuit will return to its initial condition, the relay 162 will not be energized and no audible alarm will be sounded.

Assume that the short is not temporary but a permanent short. The capacitor 172 will charge through resistors 174 and 170 until the voltage on the + input of the detection circuit 156 drops below that on the − input. At this point, the output signal from detecting circuit 156 will drop to a large negative potential energizing the coil 162*a* of relay 162, causing the pole 162*c* to go in contact with contact 162*d.*

Under this condition, current will flow from the power supply to ground through the horn 160, pole 162*c*, contact 162*d*, contact 164*a* and pole 164*b*. Should it be desired to stop the sound of the horn, the switch 164 can be actuated disconnecting pole 164*b* from contact 164*a* thereby opening the circuit with the horn 160.

Assume that the short is removed, under these conditions, the signal applied across the resistor 122 returns to its initial 0 volt condition and the capacitor 172 rapidly discharges through the circuit including diode 178 and resistors 170 and 122.

Although an exemplary embodiment of the invention has been disclosed for purposes of illustration, it will be understood that various changes, modifications, and substitutions may be incorporated in such embodiment without departing from the spirit of the invention as defined by the claims appearing hereinafter.

What is claimed is:

1. A detecting apparatus for erroneous electrical connections between any pair of terminals and between different pairs of terminals of a matrix, the apparatus comprising:

a. means for applying a potential difference between each individual pair of such terminals;

b. means for applying cascaded signals to such pairs of terminals, a different one of said cascaded signals being applied to at least one terminal of each such pair of terminals;

c. means for sensing a preselected potential difference between terminals of any pair of terminals; and d. means for sensing a preselected signal on the at least one terminal of each such pair of terminals.

2. An apparatus according to claim 1 wherein each such pair of terminals has an impedance means connected therebetween, the means for applying a potential difference comprising means for applying a current signal between each such pair of terminals and through the impedance means which is connected therebetween.

3. An apparatus according to calim 2 comprising a plurality of pairs of alarm terminals, one pair for each such pair of matrix terminals; a source of potential coupled across the terminals of each of the pairs of alarm terminals; and further impedance means for each of the pairs of alarm terminals coupled in between at least one of the terminals of the corresponding pair and the source of potential.

4. An apparatus according to claim 1 wherein said potential difference sensing means comprises a plurality of detection circuits, one for each such pair of matrix terminals, each detection circuit having an input for coupling across the terminals of the corresponding one of such pair of matrix terminals and being characterized for forming a predetermined output signal when the signal between the coupled terminals drops below a predetermined level.

5. An apparatus according to claim 1 wherein said means for sensing a signal on a terminal comprises a plurality of detection circuits, one corresponding to each pair of matrix terminals; and means for providing cascaded reference signals, a different reference signal for each of said pairs of matrix terminals, each detection circuit having one input for receiving a signal from at least one terminal of the corresponding one of such pair of matrix terminals and another input connected for receiving the corresponding cascaded reference signal.

6. An apparatus according to claim 3 wherein said means for sensing a preselected signal comprises a plurality of between terminal pair detecting circuits, one for each such pair of matrix terminals; a plurality of voltage dividers, one for each of the pairs of matrix terminals, coupled across said source of potential for providing a plurality of cascaded reference signals, one reference signal being provided corresponding to each such pair of matrix terminals, each of said between terminal pair detecting circuits having one input for receiving a signal from at least one terminal of the corresponding one of such pairs of matrix terminals and another input for receiving the cascaded reference signal for the corresponding pair of matrix terminals.

7. An apparatus according to claim 1 additionally comprising means for responding to a predetermined signal from at least one of said sensing means for providing an alarm signal.

8. A detecting apparatus for erroneous electrical connections between any pair of terminals and between different pairs of terminals of a matrix, the apparatus comprising:

a. a plurality of pairs of terminals;
b. means for applying an electrical signal between each said terminal pair and ana electrical signal on at least one terminal of each terminal pair which forms cascaded signals from terminal pair to terminal pair;
c. means, for each terminal pair, for sensing a preselected signal existing between the corresponding terminal pair; and
d. means, for each terminal pair, for sensing a preselected signal on the at least one terminal of the corresponding terminal pair.

9. An apparatus according to claim 8 wherein said electrical signal applying means comprises:

a. a source of potential having an output with first and second sides;
b. first impedance means for one terminal of each terminal pair for coupling the corresponding terminal to the first side of said source;
c. second impedance means for the other terminal of each terminal pair for coupling the corresponding terminal to the second side of said source; and
d. said first and second impedance means having values which cause the cascaded signals to be formed on the at least one terminal of the terminal pairs when current flows between terminals of individual terminal pairs and the first and second impedance means.

10. An apparatus according to claim 8 comprising:

a. means for providing cascaded reference signals, one such reference signal for each different terminal pair; and
b. said second named sensing means having an input coupled to receive the signal formed on the at least one terminal of the corresponding terminal pair and another input coupled to receive the reference signal corresponding to such terminal pair and adapted for providing a predetermined output signal responsive to a predetermined relationship between the signal on the at least one terminal of the corresponding terminal pair and the corresponding reference signal.

11. A detecting apparatus for erroneous electrical connections between any pair of terminals and between different pairs of terminals of a matrix comprising:

a. a plurality of apparatus terminal pairs;
b. a source of potential having first and second sides;
c. first impedance means for one terminal of each apparatus terminal pair coupled between the corresponding terminal and one side of said source;
d. second impedance means for one terminal of each apparatus terminal pair coupled between the corresponding terminal and the other side of said source;
e. the value of the impedances of the impedance means varying from apparatus terminal pair to apparatus terminal pair so as to provide, an at least one terminal of each apparatus terminal pair, a signal forming a series of cascaded signals from terminal pair to terminal pair when current flows between individual apparatus terminal pairs through the impedance means;
f. means for providing a series of cascaded reference signals, one reference signal being provided for each apparatus terminal pair;
g. first signal detecting means for each apparatus terminal pair having a separate input coupled to each terminal of the corresponding terminal pair, the first signal detecting means being adapted for providing a predetermined output responsive to a predetermined signal between the terminals of the pair; and
h. second signal detecting means for each apparatus terminal pair having one input coupled to the at least one terminal of the corresponding apparatus terminal pair and a second input coupled to receive the corresponding reference signal, the second signal detecting means being adapted for providing a predetermined output responsive to a predetermined relation between a signal on the at least one terminal to which it is coupled and the corresponding reference signal.

12. An apparatus according to claim 11 wherein said reference signal providing means comprises a voltage divider for each apparatus terminal pair, the voltage dividers providing the series of cascaded reference signals.

13. A method for detecting an erroneous electrical connection between any pair of terminals and between different pairs of terminals of a plurality of terminal pairs in a matrix, the matrix being characterized in that for each of the terminal pairs an impedance is connected therebetween or it is possible to connect an impedance therebetween and the connection from one of the terminal pairs to another, in the absence of an erroneous electrical connection, is such that cascaded signals can be established from terminal pair to terminal pair, the method comprising:

a. applying individual signals between the terminals of each of said terminal pairs,
b. applying cascaded signals to said matrix, a different one of such cascaded signals being applied to at least one terminal of each terminal pair;
c. sensing a predetermined condition of the signal between the terminals of any one of said terminal pairs to detect an erroneous electrical connection therebetween; and
d. sensing a predetermined condition of the signal at the at least one terminal of any one of said terminal pairs to detect an erroneous electrical connection from one terminal pair to another.

14. A method according to claim 13 wherein the step of applying individual signals comprises the step of applying a current signal between each said terminal pair.

15. A method according to claim 14 wherein said step of applying cascaded signals comprises the step of applying to the at least one terminal of each terminal pair a predetermined signal with reference to a reference signal.

16. A method according to claim 13 wherein the step of applying the individual signals between the terminals of all terminal pairs comprises the step of applying such signals simultaneously between terminals of all terminal pairs.

17. A method according to claim 13 wherein the step of applying cascaded signals to the at least one terminal of each terminal pair comprises the step of simultaneously applying such cascaded signals.

18. A detecting apparatus for erroneous electrical connections between any pair of terminals and between different pairs of terminals of a matrix, the apparatus comprising:

a. a plurality of pairs of terminals;
b. means for applying an electrical signal between each said terminal pair and an electrical signal on at least one terminal of each terminal pair, the latter forming cascaded signals from terminal pair to terminal pair;
c. means for sensing a preselected signal, different from the applied signal, between terminals of any terminal pair; and
d. means for sensing a preselected signal, different from the applied signal, on the at least one terminal of any of the terminal pairs.

* * * * *

PO-1050
(5/69)

UNITED STATES PATENT OFFICE
CERTIFICATE OF CORRECTION

Patent No. 3,863,034 Dated January 28, 1975

Inventor(s) Ralph Morrison

It is certified that error appears in the above-identified patent and that said Letters Patent are hereby corrected as shown below:

IN THE ABSTRACT:

Lines 6-7 should read as follows:

"applies a potential between each of the terminal pairs and is adapted for applying a cascaded signal from one terminal pair to another. A detecting circuit, for each terminal pair,"

Column 1, line 23, change "taht" to -- that --

Column 3, line 11, insert -- of -- after "diagram"

Column 8, line 52, after "0" insert -- volt output --

Column 10, line 64, change "calim" to -- claim --

Column 11, line 51, change "ana" to -- an --

Signed and sealed this 1st day of April 1975.

(SEAL)
Attest:

RUTH C. MASON
Attesting Officer

C. MARSHALL DANN
Commissioner of Patents
and Trademarks